United States Patent
Srinivas et al.

(10) Patent No.: US 8,081,591 B2
(45) Date of Patent: Dec. 20, 2011

(54) ACCESS TERMINAL PAGING IMPROVEMENTS

(75) Inventors: Satyaprasad Srinivas, San Diego, CA (US); Anthony S. Lee, San Diego, CA (US)

(73) Assignee: VIA Telecom Co., Ltd., George Town (KY)

( * ) Notice: Subject to any disclaimer, the term of this patent is extended or adjusted under 35 U.S.C. 154(b) by 749 days.

(21) Appl. No.: 12/152,835

(22) Filed: May 15, 2008

(65) Prior Publication Data

US 2008/0293440 A1    Nov. 27, 2008

Related U.S. Application Data

(60) Provisional application No. 60/930,650, filed on May 17, 2007.

(51) Int. Cl.
*G08C 17/00*    (2006.01)
(52) U.S. Cl. ........................................................ 370/311
(58) Field of Classification Search .................. 370/310, 370/311, 320, 328, 335, 338, 342, 441; 455/458, 455/515
See application file for complete search history.

(56) References Cited

U.S. PATENT DOCUMENTS

| 7,894,393 B2 * | 2/2011 | Srinivas et al. | 370/329 |
|---|---|---|---|
| 2008/0117859 A1 * | 5/2008 | Shahidi et al. | 370/328 |

FOREIGN PATENT DOCUMENTS

| CN | 1422500 | 6/2003 |
|---|---|---|
| CN | 1832619 | 9/2006 |

OTHER PUBLICATIONS

3GPP2 A.S0007-A v2.0, Interoperability Specification (IOS) for High Rate Packet Data (HRPD) Access Network Interfaces—Rev A., 214 pages, May 2003.*

* cited by examiner

*Primary Examiner* — Frank Duong
(74) *Attorney, Agent, or Firm* — James W. Huffman; Eric Cernyar

(57) ABSTRACT

A method, apparatus, and system are disclosed providing improved paging procedures in a wireless communication system. In one embodiment, a Power-down Registration signal is transmitted via a 1xRTT modem from an Access Terminal (AT) to an Access Network (AN) in a wireless communication system that includes both a 1xRTT modem and a 1xHRPD modem. The Power-down Registration signal conveys information to the AN indicating that a power-down process has been initiated by the AT, and thereby enables the AN to discontinue transmission of signals and messages to the AT that are not effective when the AT is in an off-state.

13 Claims, 2 Drawing Sheets

ACCESS TERMINAL PAGING IMPROVEMENTS

CROSS-REFERENCE TO RELATED APPLICATIONS—CLAIM OF PRIORITY

This patent application claims a benefit of priority under 35 U.S.C. §119 (e) to U.S. Provisional Application No.: 60/930,650, filed May 17, 2007, entitled "Access Terminal Paging Improvements". Provisional Application No.: 60/930,650 is incorporated by reference herein in its entirety.

BACKGROUND

1. Field

This application generally relates to the field of wireless communication systems, and more particularly to access terminal (AT) paging processes for use in such wireless communication systems.

2. Related Art

The subject matter set forth herein is applicable to wireless communication systems generally. However, it has been developed primarily in the context of cellular telecommunication systems that provide high-speed connectivity including data and voice transport on both point-to-point and point-to-multipoint bases. First-generation (analog) and second-generation (digital) cellular networks were primarily used to communicate voice traffic via mobile cellular telephones, and thus maintained a focus on access methods for the efficient transport of voice information. With the rising popularity of the Internet, a third-generation (3G) wideband multimedia cellular communications network continues to be developed to transport both voice and data at much higher speeds than were previously available using the first and second generation wireless communications networks.

Wireless Communication Standards Related to the Present Disclosure

A Third Generation Partnership Project 2 (3GPP2) has been established by industry groups for the purpose of defining specifications to transition current code-division multiple-access (CDMA) wireless networks to the third generation, which is commonly referred to as "cdma2000". One such specification is referred to as "CDMA2000 1× Revision D" (which may also be referred to as "CDMA2000 1× Rev D," "cdma2000 1×", "cdma2000 Release D," "IS-2000-D", or "IS-2000-Rel. D"). The CDMA2000 1× Rev D specification, publicly available from the 3GPP2, is incorporated by reference herein in its entirety for its teachings on communications protocols used in 3G wireless communications systems. The 3GPP2 is primarily concerned with defining specifications for CDMA systems such as are implemented in North America. A document specifying a somewhat different CDMA system, such as is used more commonly in Europe, may be identified as 3GPP TSG-RAN Release-5, and is hereby incorporated by reference for its teachings on CDMA systems. Also incorporated by reference is so much of 3GPP TSG-RAN Release-6 as has been made public, particularly including documents submitted in conjunction therewith and identified as R1-031268, R1-040534, and R1-040758.

As described in a document entitled "*Introduction to cdma2000 Standards for Spread Spectrum Systems*", available from the 3GPP2 in a document number C.S0001-D, published by the 3GPP2 in February, 2004, the "cdma2000 family of specifications" specifies a spread spectrum radio interface that uses well known Code Division Multiple Access (CDMA) wireless transmission techniques in order to meet the requirements for 3G wireless communications. The C.S0001-D document is incorporated by reference herein in its entirety. As described in the incorporated C.S0001-D reference, the cdma2000 family of standards includes specifications for the following aspects of the cdma2000 third generation wireless communication system: core air interface, minimum performance, and service standards. The cdma2000 core air interface standards are publicly available from the 3GPP2 as follows: C.S0001-D, *Introduction to cdma2000 Standards for Spread Spectrum Systems*, February, 2004; C.S0002-D, *Physical Layer Standard for cdma2000 Spread Spectrum Systems*, February, 2004; C.S0003-D, *Medium Access Control (MAC) Standard for cdma2000 Spread Spectrum Systems*, February, 2004; C.S0004-D, *Signaling Link Access Control (LAC)Standard for cdma2000 Spread Spectrum Systems*, February, 2004; and C.S0005-D, *Upper Layer (Layer 3) Signaling Standard for cdma2000 Spread Spectrum Systems*, February, 2004. In addition, the family includes a standard that specifies analog operation, to support dual-mode mobile stations and base stations. This standard is publicly available from the 3GPP2 as document number C.S0006-D, *Analog Signaling Standard for cdma2000 Spread Spectrum Systems*, February, 2004. All of the above standards are collectively referred to herein as the "cdma2000 family of standards", and are hereby incorporated herein as though set forth in full for their teachings on cdma2000 standards.

The cdma2000 family of standards allows seamless evolution from cdma2000 1× systems to cdma2000 "1×EV-DO" (1× Evolution, Data Only or Data-Optimized") and CDMA2000 1×EV-DV (1× Evolution, Data and Voice) systems. The first phase of cdma2000, cdma2000 1× systems enabled operators with existing IS-95 systems to double overall system capacity. These systems offer 3G type services at speeds up to 140 kbps peak data rate while occupying a very small amount of frequency spectrum (1.25 MHz per carrier). The cdma2000 1× systems are designed for increased voice capacity and support "always-on" data transmission of approximately 153.6 kbps on both the forward and reverse links. The cdma2000 1× systems were first deployed in October, 2000.

In 2004, the cdma2000 1×EV-DO Revision A (or "RevA") specification was approved by the 3GPP2 Technical Specification Group. Revision A provides enhanced packet data service with improvements favorable for Voice over Internet Protocol (VoIP), and supports peak data rates of 3.1 Mbps on the forward link and up to 1.8 Mbps on the reverse link. The high data rates on the reverse link and low data latency enable operators to deliver rich multimedia services, such as video telephony, and enhance user experience. Revision A is an enhanced version of 1×EV-DO Release 0 (or "Rev0"), which delivers up to 2.4 Mbps data speeds and has been commercially deployed since 2002. These systems are also referred to by the 3GPP2 as High Rate Packet Data systems, or "HRPD" systems, in the developing cdma2000 family of standards.

For example, the standard defining the 1×EV-DO Rev0 HRPD system is set forth in 3GPP2 document number C.S0024-0 (Versions "V 2.0", "V 3.0" and "V4.0") entitled *cdma2000 High Rate Packet Data Air Interface Specification*, dated Oct. 27, 2000 (for Version V 2.0), Dec. 5, 2001 (for Version V 3.0), Oct. 25, 2002 (for Version V 4.0). The standard defining the 1×EV-DO RevA HRPD system is set forth in 3GPP2 document number C.S0024-A (Versions 1.0 (dated March 2004), 2.0 (dated July 2005), 3.0 (dated September 2006), and is entitled "*cdma2000 High Rate Packet Data Air Interface Specification*". These standards include technical requirements for providing compatibility with cdma2000 HRPD systems. These standards set forth technical requirements that ensure that a compliant Access Terminal ("AT") can obtain service through any access network that conforms to the standards. The specifications may also be referred to as "IS-856", and is also referred to as (CDMA system) "EV-DO". The Rev 0 and Rev A IS-856 specifications have been published and are available from the 3GPP2 organization as IS-856 and IS-856-A (also C.S0024-A, C.S0024-B as cited above), and are incorporated by reference herein in their entireties. All of the HRPD air interface specifications set forth above are hereby incorporated by reference herein as though set forth in full.

In addition to the HRPD standards cited above, 3GPP2 document numbers A.S0007-0 (version V 1.0), A.S0007-0 (version V 2.0), A.S0007-A (versions V 1.0 and V 2.0) and A.S0008-0 (version V 3.0) all describe an inter-operability specification for a Radio Access Network (RAN) that supports HRPD. These specifications contain message procedures and formats necessary to obtain interoperability. Document numbers A.S0007-A (version V 2.0), entitled *Interoperability Specification (IOS) for High Rate Packet Data (HRPD) Access Network Interfaces—Rev A, Revision A (Post SDO Ballot, Pre-SDO Publication Version)*, dated May, 2003 (TIA-1878), and A.S0008-0 (Version V 3.0), entitled *Interoperability Specification (IOS) for High Rate Packet Data (HRPD) Access Network Interfaces—Revision 0 (Post SDO Ballot, Pre-SDO Publication Version)*, dated May 2003, (TIA-878-1) supersede the standards noted above. All of the HRPD interoperability specifications set forth above are hereby incorporated by reference herein as though set forth in full.

Other standards related to cdma2000 compatible HRPD systems are publicly available from the 3GPP2. For example, 3GPP2 document number C.S0054-0, Version V 2.0, entitled *CDMA2000 High Rate Broadcast-Multicast Packet Data Air Interface Specification*, dated July, 2005, sets forth technical requirements that form the compatibility standard for cdma2000 broadcast high rate packet data systems. These technical requirements ensure that a compliant access terminal (AT) can obtain service through any access network conforming to the standard. The C.S0054-0, Version V 2.0 document is also hereby incorporated by reference herein as though set forth in full.

The acronym "1xRTT" is an acronym for "1x (single-carrier) Radio Transmission Technology." The cdma2000 1xRTT digital wireless standard replaced the IS-95 CDMA standard. The cdma2000 1xRTT wireless air interface standard may also be referred to as IS-2000 1xRTT.

Paging an Access Terminal in a 1xHRPD System

As set forth in the standards relating to cdma2000 and HRPD systems (e.g., 3GPP2 document number C.S0024-B (Version "V 1.0"), hereby incorporated by reference herein as though set forth in full), the Default Idle State Protocol and the Enhanced Idle State Protocol are Connection Layer protocols of a 1xHRPD system comprising an Access Terminal (AT) and an Access Network (AN). These two protocols provide the procedures and messages used by the AT and the AN when the AT has acquired an AN and a connection is not open. These two protocols include procedures and messages relating to the sleep state and monitor state of an AT. For example, these idle state protocols include procedures and messages that describe the times at which an AT can be paged by the AN, and thereby support AT power conservation. These protocols are effective only when a AT is in an on-state. When the AT is powered down (i.e., in an off-state), any paging, or other signals relating to the Idle State Protocols and transmitted by the AN to the AT are ineffective, thereby wasting AN resources.

The Route Update Protocol for a 1xHRPD system provides procedures and messages that enable the AN to keep track of the approximate location of an AT. However, because the RouteUpdate message is not transmitted in the event of a power-down procedure by an AT that has previously acquired an AN, the AN has no way to determine if the 1xHRPD AT continues to be powered-up and ready to receive pages. The AN, therefore, continues to repeatedly page the AT, thereby wasting network resources.

The present disclosure is directed toward providing a method, apparatus and system to overcome the limitations of the prior art paging processes described above for a wireless communication system that includes a 1xHRPD system and a 1xRTT system. In particular, the present disclosure relates to a method, apparatus and system to provide notification to the AN in the event that a power-down procedure is executed by the AT, thereby enabling the AN to discontinue signals and messages to the AT that are not effective when the AT is in an off-state.

Therefore, there is a need for such a method, apparatus and system. The method, apparatus and system set forth herein addresses the needs set forth above.

SUMMARY

A method, apparatus, and system are disclosed to adapt a wireless communication system to provide improved paging procedures. In one embodiment, a Power-down Registration message or signal is transmitted from an Access Terminal (AT) to an Access Network (AN) for a wireless communication system that includes both 1xRTT and 1xHRPD systems. The Power-down Registration signal conveys information to the AN indicating that a power-down process has been initiated by the AT, and thereby enables the AN to discontinue signals and messages to the AT that are not effective when the AT is in an off-state, even when the power-down process is initiated when the 1xHRPD modem is selected.

In a first method embodiment, a method for improving paging procedures begins at a step wherein a power-down process for a hybrid AT (i.e., an AT having both a 1xRTT modem and a 1xHRPD modem) is initiated. The power down step may be initiated by a User Interface via a Controller, or, in another embodiment, the power-down process at the first step may be initiated when a low-battery-power condition is detected by the AT. For example, the power-down process may be initiated for the hybrid AT while in a Connected State of an 1xHRPD modem included in the hybrid AT. In another example, the power-down process may be initiated for the AT while the 1xHRPD is in a Monitor State.

At a next step, the method determines whether the 1xHRPD modem is in the Monitor State. In some embodiments, if the 1xHRPD is determined not to be in the Monitor State, the method sets the 1xHRPD modem in the Monitor State.

At a next step, the power-down process is temporarily stopped or frozen, and a 1xRTT modem is activated. While the 1xRTT modem is in the Monitor State, the 1xHRPD modem is maintained in an inactive or "freeze state". The method then proceeds to a next step.

At the next step, A Power-down Registration Message is transmitted from the 1xRTT modem to the AN. The Power-down Registration Message informs the AN that the AT is being turned off, and also provides a last-known good position for the AT. Subsequent to this step, the method branches into two paths. The two paths may be executed independently.

The AN may be adaptively configured, using information received in the Power-down Registration Message, so that unnecessary signals (e.g., paging signals) directed to the 1×HRPD modem are not sent from the AN to the AT when the AT is in the off-state. The 1×RTT modem is de-activated, and the 1×HRPD modem is reactivated and resumes operation in the Monitor State, without performing a network acquisition process. The method then executes a subsequent step, wherein the standard power-down process is completed.

An Access Terminal (AT) is also disclosed wherein the AT transmits a Power-Down Registration message to an Access Network (AN). In one embodiment, the AT includes a 1×HRPD modem and a 1×RTT modem. The 1×HRPD modem and the 1×RTT modem are coupled to the AT to convey messages to and from the AN. In one embodiment, the AT also includes a User Interface and a Controller. The 1×HRPD modem and the 1×RTT modem are adapted to perform the steps described in reference to the method embodiment hereinabove.

DETAILED DESCRIPTION

A method, apparatus, and system are described for providing a Power-down Registration message from an Access Terminal (AT) to an Access Network (AN) for use in a hybrid wireless communication system that includes both 1×RTT and 1×HRPD systems. The Power-down Registration message conveys information from the AT to the AN to indicate that a power-down process is initiated by the AT, and thereby enables the AN to discontinue transmission of signals and messages to the AT that are ineffective when the AT is in an off-state.

As described above in reference to standards for cdma2000 and HRPD systems (e.g., 3GPP2 document number C.S0024-B (Version "V 1.0"), hereby incorporated by reference herein as though set forth in full, prior art 1×HRPD wireless communication systems do not provide a capability whereby an AT can notify an AN in the event that the AT is entering a Power-down process. This limitation exists because RouteUpdate messages are not transmitted in the event of Power-down procedures. The Route Update Protocol for a 1×HRPD system provides procedures and messages that enable the AN to track the approximate location of an AT. However, because the RouteUpdate message is not transmitted in the event of a power-down procedure by an AT that has previously acquired an AN, the AN cannot determine if the 1×HRPD AT continues to be powered-up and is ready to receive pages. The AN, therefore, continues to repeatedly page the AT, thereby wasting valuable network resources.

As described in detail below in reference to FIG. 2, a hybrid wireless communication system that includes an AT having both a 1×HRPD modem and a 1×RTT modem may be adapted in accordance with the present teachings to send a Power-down Registration message from the AT to an AN by activating the 1×RTT modem to send the Power-down Registration Message.

Exemplary Hybrid Wireless Communication System

Figure 1:
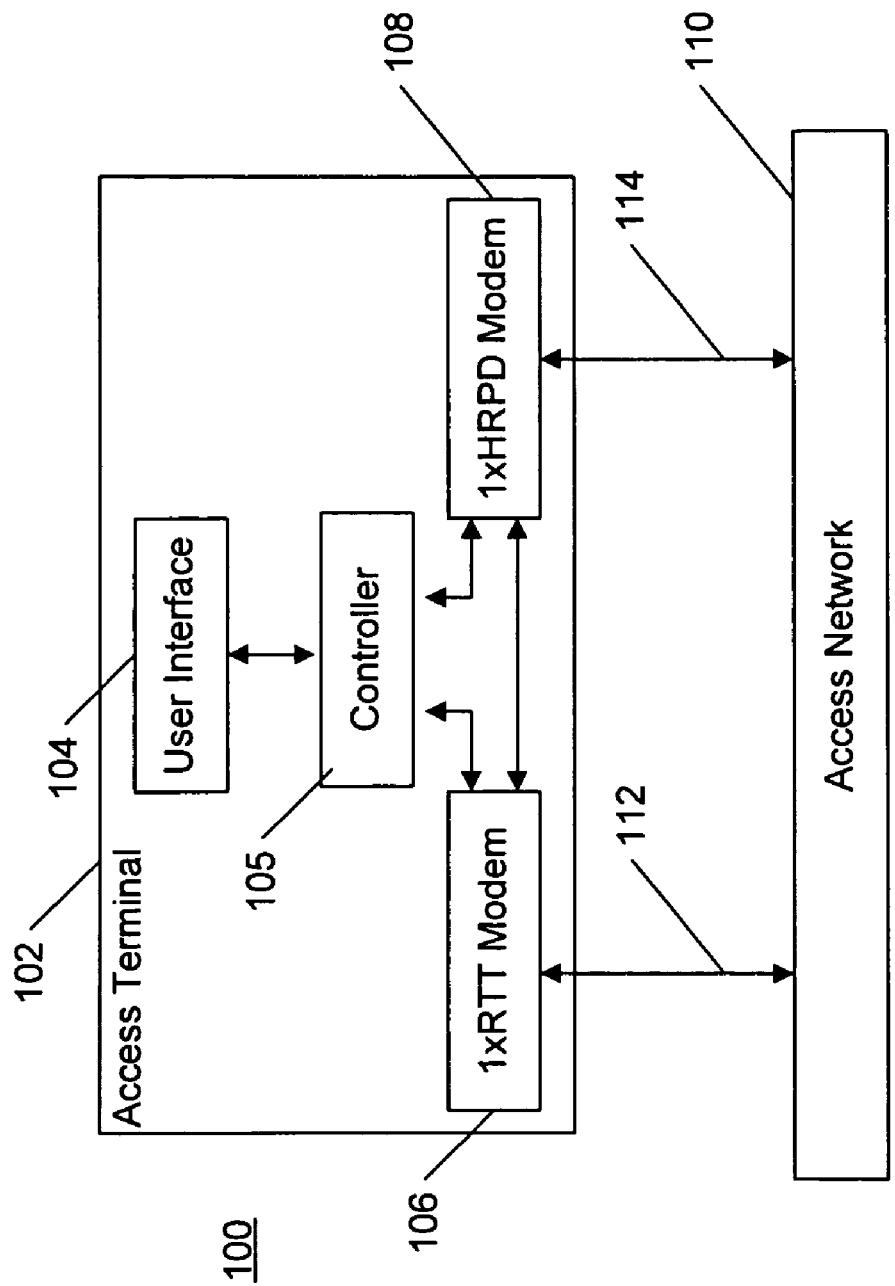
FIG. 1 is a block diagram of a wireless communication system including an access terminal and an access network.

FIG. 1 is a simplified block diagram of a wireless communication system 100. The system 100 includes a hybrid Access Terminal (AT) 102 having a 1×RTT modem 106 and a 1×HRPD modem 108. The hybrid AT 102 also includes a User Interface 104 and a Controller 105 for connecting and operating the User Interface 104. The Controller 105 is operatively connected to both the 1×RTT modem 106 and the 1×HRPD modem 108. The modems 106, 108 are used to transmit and receive radio frequency signals 112 and 114. Signals 112 and 114 are wireless signals that are exchanged between the AN 110 and the 1×RTT modem 106 and the 1×HRPD modem 108, respectively. The 1×RTT modem 106 and the 1×HRPD modem 108 are operatively connected to each other in order to exchange control signals that may be required according to the steps of an improved paging method described in detail below with reference to FIG. 2. In some embodiments, the User Interface 104 may include a microphone, a display, a keyboard, a touch panel, and/or voice recognition modules. The Controller 105 may in some embodiments comprise a processor or a plurality of processors used to interface to the User Interface 104. For example, a real-time operating system and communication software processes may be executed by the Controller 105 in order to access the User Interface 104 and control both the 1×RTT modem 106 and the 1×HRPD modem 108. In these embodiments, by means of the operating system and software processes, the Controller 105 performs logic control of the AT 102. According to some embodiments, the AT 102 may include a low-battery power detector (not shown).

Exemplary Method for Implementing Paging Enhancements

Figure 2:
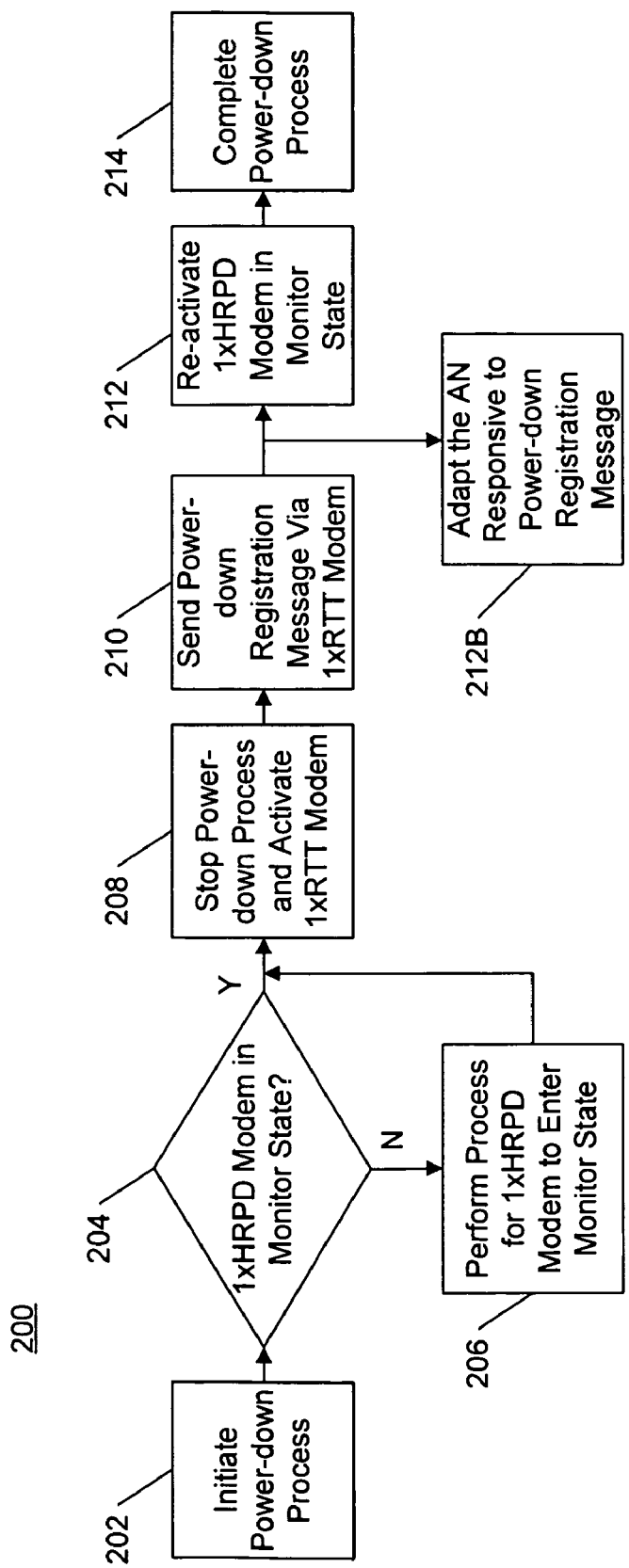
FIG. 2 is a flow-chart diagram of a process for providing a Power-down Registration Message from an access terminal to an access network.

FIG. 2 is a flow chart diagram that illustrates a method 200 for adapting a hybrid wireless communication system (e.g., the system 100 of FIG. 1) to provide improved paging procedures. In one embodiment, the method 200 is executed by the Controller 105 of FIG. 1. However, those skilled in the art shall recognize that the method 200 may be executed by other processors, and is not limited to being executed by the Controller 105 shown in FIG. 1. In one embodiment, a Power-down Registration Message is transmitted from a hybrid AT (e.g., the AT 102 of FIG. 1) to an AN (e.g., the AN 110 of FIG. 1).

According to one embodiment, the method 200 begins at a STEP 202, whereat a power-down process for the hybrid AT is initiated (e.g., at the Controller 105) by means of a User Interface (e.g., the User Interface 104 of FIG. 1). According to another embodiment, the power-down process at the STEP 202 may be initiated due to a low-battery-power condition of the AT. Means for detecting the low-battery-power condition in an AT are well-known to persons skilled in the arts of AT design. According to this embodiment, the power-down process may be initiated when the low-battery power condition is detected by the AT to be at a selected level of the battery power. In one example, the power-down process may be initiated for the hybrid AT 102 while the 1×HRPD modem 108 is in a "Connected State". When in a Connected State, the 1×HRPD modem 108 has a connection with the AN 110 for receiving and sending data. In another example, the power-down process may be initiated for the AT 102 while the 1×HRPD modem 108 is in a "Monitor State." The Monitor State is an Idle State wherein the AT 102 monitors a Control Channel, listens for Page messages, etc.

At a STEP 204, the method 200 determines whether the 1×HRPD modem 108 is in a Monitor State. If YES, then the method 200 proceeds to a STEP 208. If NO, then the method proceeds to a STEP 206.

If the 1×HRPD is not in the Monitor State, the STEP 206 is invoked. For example, if the 1×HRPD modem 108 is in a Connected State, standard procedures are performed to terminate the connection. After the connection is terminated, standard procedures are performed to set the 1×HRPD modem 108 into the Monitor State by the AT 102. The method 200 then proceeds to the STEP 208.

At the STEP 208, the power-down process is temporarily stopped or "frozen", and a 1×RTT modem (e.g., the modem 106 of FIG. 1) is activated. This is accomplished by a "tune-away" procedure, wherein the 1×HRPD modem 108 is de-activated and the 1×RTT modem 106 is activated and placed into a Monitor State. While the 1×RTT modem 106 is in the Monitor State, the 1×HRPD modem 108 is maintained in an inactive or "freeze state". The method 200 then proceeds to a STEP 210.

At the STEP 210, the Power-down Registration Message is transmitted from the 1×RTT modem 106 to the AN 110. The Power-down Registration Message informs the AN 110 that the AT 102 is being turned off, and also provides a last-known "good" position for the AT 110.

Subsequent to the STEP 210, the method 200 proceeds to steps comprising two paths. In a first path, the method 200 proceeds to STEPS 212 and 214. In a second path the method 200 proceeds to a STEP 212B. The STEPS 202 through 210, and the STEPS 212 and 214 are performed in the AT. The STEP 212B is performed in the AN. The first path (STEPS 212 and 214) and the second path (STEP 212B) are independently executed. I.e., the two paths may be concurrently executed, the first path may be executed prior the second path, or the second path may be executed prior to the first path.

Proceeding according to the first path, the method 200 proceeds from the STEP 210 to the STEP 212B. At the STEP 212B, the AN 110 may be adaptively configured, using information received in the Power-down Registration Message, so that unnecessary signals directed to the 1×HRPD modem 108 are not transmitted from the AN 110 to the AT 102 when the AT 102 is in the off-state. For example, the AN 110 may be adapted so that paging messages or other signals relating to the Idle State Protocols, are discontinued. If the AN 110 is not so adapted, the AN 110 will continue to send these signals to the AT 102 after it has been powered-down, thereby wasting valuable network resources. The ability to adapt the AN 110 for improved paging efficiency, responsive to the power-down registration message provided by the STEP 210, is an advantage of the present teachings over prior art.

Proceeding according to the second path, the method 200 proceeds from the STEP 210 to the STEP 212. At the STEP 212, the 1×RTT modem 106 is de-activated, and the 1×HRPD modem 108 resumes operation in the Monitor State, without performing a network acquisition process.

The method then proceeds from the STEP 212 to a STEP 214, wherein the standard power-down process for the AT is completed.

CONCLUSION

The foregoing description illustrates exemplary implementations, and novel features, of a method, apparatus, or system that enables implementation of a Power-down Registration Message transmitted from an AT to an AN in a wireless communication system that includes both 1×RTT and 1×HRPD systems. The Power-down Registration Message indicates that a power-down process has been initiated by the AT, and thereby enables the AN to be adaptively configured for improved network efficiency. For example, the AN may be adapted to discontinue signals and messages to the AT that are not effective when the AT is in an off-state, even when the power-down process is initiated when the 1×HRPD modem is in a Connected State or in a Monitor State.

While the above description has pointed out novel features of the invention as applied to various embodiments, the skilled person will understand that various omissions, substitutions, and changes in the form and details of the methods and systems illustrated may be made without departing from the scope of the invention.

Each practical and novel combination of the elements described hereinabove, and each practical combination of equivalents to such elements, is contemplated as an embodiment of the invention. Because many more element combinations are contemplated as embodiments of the invention than can reasonably be enumerated explicitly herein, the scope of the invention may properly be defined only by the appended claims, rather than by the foregoing description. All variations coming within the meaning and range of equivalency of the various claim elements are embraced within the scope of the corresponding claim. Each claim set forth below is intended to encompass any system or method that differs only insubstantially from the literal language of such claim, as long as such system or method is not, in fact, an embodiment of the prior art. To this end, each described element in each claim should be construed as broadly as possible, and moreover should be understood to encompass any equivalent to such element, insofar as possible without also encompassing the prior art.

What is claimed is:

1. A method for transmitting a Power-Down Registration message from an Access Terminal (AT) to an Access Network (AN) in a wireless communication system, comprising the steps of:
   a) initiating a Power-Down process of an AT;
   b) determining if a 1×HRPD (High Rate Packet Data) modem of the AT is in a Monitor State;
   c) suspending the Power-Down process, inactivating the 1×HRPD modem, and activating a 1×RTT (Radio Transmission Technology) modem of the AT when the 1×HRPD modem is in the Monitor State; and
   d) transmitting a Power-Down Registration message from the AT to the AN, wherein the 1×RTT modem transmits the Power-Down Registration message.

2. The method of claim 1, further comprising the step of:
   e) if the 1×HRPD modem is determined not in the Monitor State at step b), then setting the 1×HRPD modem in the Monitor State.

3. The method of claim 1, further comprising the steps of:
   f) reactivating the 1×HRPD modem in the Monitor State; and
   g) completing the Power-Down process.

4. The method of claim 1, further comprising the step of adapting the AN responsive to the Power-Down Registration message.

5. The method of claim 1, wherein the Power-Down process of the AT is initiated by means of a user interface.

6. The method of claim 1, wherein the Power-Down process of the AT is initiated responsive to a low-battery-power condition of the AT.

7. The method of claim 4, wherein the step of adapting the AN responsive to the Power-Down Registration message includes a step of discontinuing messages from the AN to the AT relating to Idle State Protocols.

8. An Access Terminal (AT) for transmitting a Power-Down Registration message to an Access Network (AN), comprising:
   a 1×HRPD (High Rate Packet Data) modem, wherein the 1×HRPD modem is coupled to the AT and conveys messages to and from the AN;
   a 1×RTT (Radio Transmission Technology) modem, wherein the 1×RTT modem is coupled to the AT and conveys messages to and from the AN; and a controller, coupled to the 1×HRPD modem and the 1×RTT modem, wherein the controller is configured to perform the steps of:
a) initiating a Power-Down process;
b) determining if the 1×HRPD modem of the AT is in a Monitor State;
c) suspending the Power-Down process, inactivating the 1×HRPD modem, and activating the 1×RTT modem of the AT when the 1×HRPD modem is in the Monitor State; and
d) transmitting the Power-Down Registration message to the AN, wherein the 1×RTT modem transmits the Power-Down Registration message.

9. The Access Terminal of claim 8, wherein the controller is further adapted to perform the step of:
e) if the 1×HRPD modem is determined not in the Monitor State at step b), then setting the 1×HRPD modem in the Monitor State.

10. The Access Terminal of claim 8, wherein the controller is further adapted to perform the steps of:
f) reactivating the 1×HRPD modem in the Monitor State; and
g) completing the Power-Down process.

11. The Access Terminal of claim 8, further comprising a user interface, coupled to the controller, for initiating the Power-Down process.

12. The Access Terminal of claim 8, further comprising a low-battery power detector for initiating the Power-Down process.

13. An Access Terminal (AT) for transmitting a Power-Down Registration message to an Access Network (AN), comprising:
a 1×HRPD (High Rate Packet Data) modem, wherein the 1×HRPD modem is coupled to the AT and conveys messages to and from the AN;
a 1×RTT (Radio Transmission Technology) modem, wherein the 1×RTT modem is coupled to the AT and conveys messages to and from the AN;
wherein the AT is configured to:
a) initiate a Power-Down process;
b) determine if a 1×HRPD (High Rate Packet Data) modem of the AT is in a Monitor State;
c) suspend the Power-Down process, inactivate the 1×HRPD modem, and activate a 1×RTT (Radio Transmission Technology) modem of the AT when the 1×HRPD modem is in the Monitor State; and
d) transmit a Power-Down Registration message from the AT to the AN, wherein the 1×RTT modem transmits the Power-Down Registration message.

* * * * *